(12) United States Patent
Zhang

(10) Patent No.: US 11,698,714 B2
(45) Date of Patent: Jul. 11, 2023

(54) METHOD, APPARATUS AND ELECTRONIC DEVICE OF PAGE DISPLAY FOR APPLICATION

(71) Applicant: BEIJING ZITIAO NETWORK TECHNOLOGY CO., LTD., Beijing (CN)

(72) Inventor: Ke Zhang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/517,551

(22) Filed: Nov. 2, 2021

(65) Prior Publication Data
US 2022/0382417 A1    Dec. 1, 2022

(30) Foreign Application Priority Data
May 31, 2021  (CN) .......................... 202110603466.0

(51) Int. Cl.
*G06F 3/0482* (2013.01)
(52) U.S. Cl.
CPC ................. *G06F 3/0482* (2013.01)
(58) Field of Classification Search
CPC . G06F 3/0482; G06F 3/04817; G06Q 10/109; H04N 5/77
See application file for complete search history.

(56) References Cited

U.S. PATENT DOCUMENTS

| | | | |
|---|---|---|---|
| 11,336,946 B1* | 5/2022 | Gheen | G06F 3/04817 |
| 2010/0088632 A1 | 4/2010 | Knowles et al. | |
| 2011/0167369 A1* | 7/2011 | van Os | G06Q 10/109 |
| | | | 715/833 |
| 2016/0011758 A1* | 1/2016 | Dornbush | H04N 5/77 |
| | | | 715/764 |

FOREIGN PATENT DOCUMENTS

| | | |
|---|---|---|
| CN | 105741766 A | 7/2016 |
| CN | 109597538 A | 4/2019 |
| CN | 111722765 A | 9/2020 |
| CN | 112463237 A | 3/2021 |

OTHER PUBLICATIONS

Search Report/Written Opinion dated Jul. 5, 2022 for PCT Application No. PCT/CN2022/091886.

* cited by examiner

*Primary Examiner* — Cao H Nguyen

(57) ABSTRACT

The invention relates to a page display method, apparatus for an application and an electronic device. The method comprises the following steps: displaying a navigation bar of the application, wherein the navigation bar comprises a first style of publisher, the navigation bar is used for providing a set of recommended functions of the application, and the publisher is used for creating multimedia contents and/or starting a live webcast; when no operation triggered on the publisher is received after a first preset duration, switching to display a second style of publisher in the navigation bar from the first style of publisher, and a color contrast between the second style of publisher and the navigation bar is smaller than that between the first style of publisher and the navigation bar, and/or a display area of a target color in the second style of publisher is smaller than that of the target color in the first style of publisher, and the target color is a color which is most distinct from a fill color of the navigation bar.

18 Claims, 9 Drawing Sheets

METHOD, APPARATUS AND ELECTRONIC DEVICE OF PAGE DISPLAY FOR APPLICATION

CROSS-REFERENCE TO RELATED APPLICATIONS

This application claims priority to Chinese Patent Application No. 202110603466.0, filed on May 31, 2021, the disclosure of which is hereby incorporated by reference in its entirety.

FIELD OF THE INVENTION

The disclosure relates to the technical field of computers, in particular to a method, apparatus and electronic device of page display for application.

BACKGROUND

At present, various types of applications are installed in electronic devices, and there may be controls in the applications that need to be displayed for a long time, which leads to a problem that abnormal display easily appears in the screen area where the controls are located.

DISCLOSURE OF THE INVENTION

In order to solve the above technical problem or at least partially solve the above technical problem, the present disclosure provides method, apparatus, and electronic device of page display for application.

In a first aspect, the present disclosure provides a page display method for an application, which includes:

displaying a navigation bar of the application, wherein the navigation bar comprises a first style of publisher therein, the navigation bar is used for providing a set of recommended functions of the application, and the publisher is used for creating multimedia contents and/or starting a live webcast;

when no operation triggered on the publisher is received after a first preset duration, switching to display a second style of publisher in the navigation bar from the first style of publisher, wherein a color contrast between the second style of publisher and the navigation bar is smaller than that between the first style of publisher and the navigation bar, and/or a display area of a target color in the second style of publisher is smaller than that of the target color in the first style of publisher, the target color being a color which is most distinct from a fill color of the navigation bar.

By the method provided in the first aspect, the electronic device displays a navigation bar which includes a first style of publisher therein. When no operation triggered on the publisher is received after a first preset duration, the electronic device switches to display a second style of publisher in the navigation bar from the first style of publisher. Wherein, a color contrast between the second style of publisher and the navigation bar is smaller than that between the first style of publisher and the navigation bar, and/or a display area of a target color in the second style of publisher is smaller than that of the target color in the first style of publisher, and the target color is a color which is most distinct from a fill color of the navigation bar. Therefore, by adjusting parameters such as brightness, color and duration, etc. to change the style of the publisher, the brightness difference between the publisher and the navigation bar is reduced, the number and power consumption of pixel points which are in white always-on states in the screen area where the publisher is located can be reduced, and the problem of screen burning or afterimage appearing in the screen area where the publisher is located due to long-time display of the publisher can be avoided, so that the electronic device can display the publisher in the navigation bar for a long time, improve the user's experience of using the application and prolong the service life of the screen of the electronic device.

In a possible design, the first style of publisher can include a background element filled with the target color and a key element located inside the background element; the second style of publisher may include: a key element that is not filled with the target color; wherein the background element is used to highlight the publisher, and the key element is used to trigger the publisher.

In a possible design, the background element is in a shape of rounded rectangular ring and the key element is in a shape of cross.

In a possible design, the displaying the second style of publisher in the navigation bar comprises rotating and displaying the key element in the navigation bar.

In a possible design, the background element is in a shape of rounded rectangular ring and the key element is in a shape of circle.

In a possible design, the displaying the second style of publisher in the navigation bar comprises enlarging the key element in the navigation bar.

In a possible design, the first style of publisher can include a background element filled with the target color and a key element located inside the background element; the second style of publisher may include: a background element filled with a first color and a key element located inside the background element, and the first color is not the target color; wherein the background element is used to highlight the publisher, and the key element is used to trigger the publisher.

In a possible design, the background element is in a shape of circular ring and the key element is in a shape of cross, or, the background element is in a shape of rounded rectangular ring and the key element is in a shape of cross.

In a possible design, when playing a multimedia content of the application, the second style of publisher further includes a first identification element located inside the background element, which is used to indicate that the publisher can be triggered to create multimedia contents; or when playing a live webcast picture of the application, the second style of publisher further includes a second identification element located inside the background element, which is used to indicate that the publisher can be triggered to start the live webcast.

In a possible design, the method further comprises: hiding the navigation bar when no operation triggered on the publisher is received after a second preset duration, wherein the second preset duration is longer than the first preset duration.

In a second aspect, the present disclosure provides a page display apparatus for an application, which includes:

a first display module configured to display a navigation bar of the application, wherein the navigation bar comprises a first style of publisher, the navigation bar is used for providing a set of recommended functions of the application, and the publisher is used for creating multimedia contents and/or starting a live webcast;

a second display module configured to, when no operation triggered on the publisher is received after a first preset duration, switch to display a second style of publisher in the navigation bar from the first style of publisher, wherein a color contrast between the second style of publisher and the navigation bar is smaller than that between the first style of publisher and the navigation bar; and/or a display area of a target color in the second style of publisher is smaller than that of the target color in the first style of publisher, and the target color is a color which is most distinct from a fill color of the navigation bar.

In a possible design, the first style of publisher can include a background element filled with the target color and a key element located inside the background element; the second style of publisher may include: a key element that is not filled with the target color; wherein the background element is used to highlight the publisher, and the key element is used to trigger the publisher.

In a possible design, the background element is in a shape of rounded rectangular ring and the key element is in a shape of cross.

In a possible design, the second display module is specifically configured to rotate and display the key element in the navigation bar.

In a possible design, the background element is in a shape of rounded rectangular ring and the key element is in a shape of circle.

In a possible design, the second display module is specifically configured to enlarge and display the key element in the navigation bar.

In a possible design, the first style of publisher can include a background element filled with the target color and a key element located inside the background element; the second style of publisher may include: a background element filled with a first color and a key element located inside the background element, and the first color is not the target color; wherein the background element is used to highlight the publisher, and the key element is used to trigger the publisher.

In a possible design, the background element is in a shape of circular ring and the key element is in a shape of cross, or, the background element is in a shape of rounded rectangular ring and the key element is in a shape of cross.

In a possible design, when playing a multimedia content of the application, the second style of publisher further includes a first identification element located inside the background element, which is used to indicate that the publisher can be triggered to create multimedia contents; or when playing a live webcast picture of the application, the second style of publisher further includes a second identification element located in the background element, which is used to indicate that the publisher can be triggered to start the live webcast.

In a possible design, the apparatus further comprises a hiding module configured to hide the navigation bar when no operation triggered on the publisher is received after a second preset duration, wherein the second preset duration is longer than the first preset duration.

The page display apparatus for the application provided in the above second aspect and various possible designs of the above second aspect can achieve advantageous effects which can refer to the advantageous effects achieved by the above first aspect and various possible implementations of the first aspect, and will not be described in detail herein.

In a third aspect, the present disclosure provides an electronic device including a memory and a processor; the memory is configured to store program instructions; and the processor is configured to invoke the program instructions in the memory so that the electronic device executes the page display method for the application in the first aspect and any possible implementation of the first aspect.

In a fourth aspect, the present disclosure provides a computer storage medium including computer instructions that, when running on an electronic device, cause the electronic device to execute the page display method for the application in the first aspect and any possible implementation of the first aspect.

In a fifth aspect, the present disclosure provides a computer program product that, when running on a computer, cause the computer to execute the page display method for the application in the first aspect and any possible implementation of the first aspect.

In a sixth aspect, the present disclosure provides a chip system, which is applicable to an electronic device including a display, a memory and a sensor; the chip system includes a processor; when the processor executes computer instructions stored in the memory, the electronic device executes the page display method for the application in the first aspect and any possible implementation of the first aspect.

DESCRIPTION OF THE DRAWINGS

The accompanying drawings, which are incorporated in and constitute a part of the present specification, illustrate embodiments according to the present disclosure, and serve to interpret the principle of the present disclosure together with the specification.

In order to more clearly illustrate technical solutions in the present disclosure or in the prior art, the accompanying drawings required to be used in the embodiments or prior art descriptions will be described, and it is obvious that for those skilled in the art, other figures can be obtained in accordance with these figures without creative effort.

DETAILED DESCRIPTION OF PREFERRED EMBODIMENTS

Figure 1:
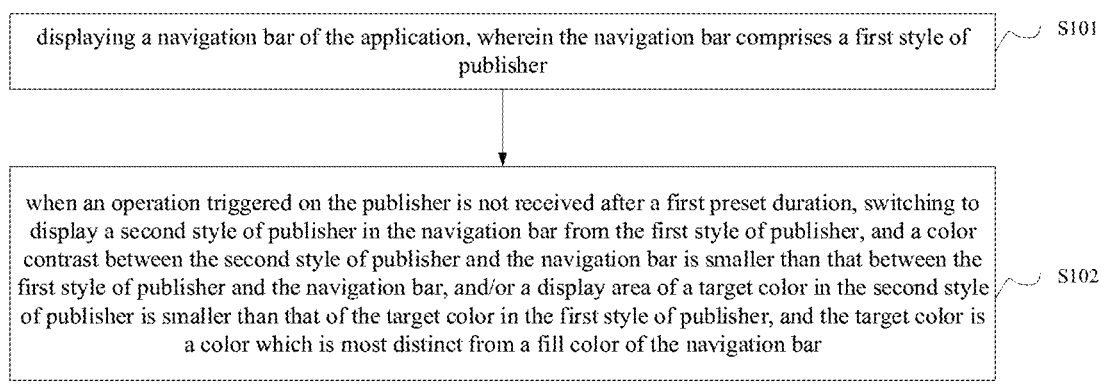
FIG. 1 is a flow diagram of a page display method for an application provided by an embodiment of the present disclosure.

In order to make the objects, technical solutions, and advantages of the present disclosure clearer, the technical solutions in the present disclosure will be further described. It should note that the embodiments and features in the embodiments of the present disclosure can be combined without conflicting with each other.

In the following description, many specific details are set forth in order to fully understand the disclosure, but the disclosure can also be implemented in other ways different from those described herein; Obviously, the embodiments in the specification are only part of the embodiments of this disclosure, not all of them.

At present, a navigation bar in an application often needs to be displayed on the screen of electronic device for a long time. The navigation bar occupies a relatively large area in the screen, while controls, such as publishers, etc., in the navigation bar occupy relatively small areas in the screen. Therefore, pixel points in the screen area where the navigation bar is located can be set to black always-off state, and the pixels in the screen area where the controls are located can be set to white always-on state, which can avoid the problem that large-scale screen burning or afterimage appear in the screen area where the navigation bar is located.

Based on the description of the foregoing embodiments, the present disclosure provides a method, apparatus, device, computer storage medium and computer program product for page display for an application, which can, by adjusting parameters such as brightness, area and duration, etc., change parameters involved in styles of the controls in a navigation bar such as color and/or shape, etc., reduce the brightness difference between the controls and the navigation bar, reduce the number and power consumption of pixel points in the screen area where the controls are located which are in white always-on states, avoid the problem of screen burning or afterimage appearing in the screen area where the controls are located due to the long-time display of the controls, so that the electronic device can have a function of displaying the navigation bar and the controls in the navigation bar for a long time, which is beneficial to improve the user's experience of using the application and prolong the service life of the screen of the electronic device.

Among others, the screen of the electronic device may include, but not limited to, an Organic Light-Emitting Diode (OLED) screen or a liquid crystal display (LCD) screen, etc.

Among others, due to self-illumination characteristics of OLED screen, the actual service life of respective pixels in OLED screen are inconsistent. When the OLED screen is used for a long time, some pixels will age faster than other surrounding pixels due to keep emitting light for a long time, which leads to a significant decrease in the brightness of the OLED screen, etc. The aforementioned process is called "screen burning".

Among others, due to the passive illumination characteristics of LCD screen, when the LCD screen is used for a long time, the display of the same screen picture is always maintained, and when switching to another screen picture, the shadow of the previous screen picture can still appear in the current screen picture, which is called "afterimage".

The page display method for the application of the present disclosure can be executed by electronic devices. Electronic devices can be tablet computers, mobile phones, wearable devices, vehicle-mounted devices, augmented reality (AR)/virtual reality (VR) devices, notebook computers, ultra-mobile personal computer (UMPC), netbooks, personal digital assistant (PDAs), smart TVs, smart screens, high-definition TVs, 4K TVs, smart speakers, smart projectors, etc., and the specific types of electronic devices are not limited in any way in the present disclosure.

Among others, the type of operating system of electronic device is not limited in any way in the present disclosure, and can be, for example, Android system, Linux system, Windows system, iOS system, etc.

Based on the foregoing description, the embodiment of this disclosure takes the electronic device as an example, and elaborates the page display method for the application provided by this disclosure in combination with the drawings and application scenarios.

FIG. 1 is a flow diagram of a page display method for an application provided by an embodiment of the present disclosure. As shown in FIG. 1, the page display method for the application provided by the present disclosure may include:

S101. display a navigation bar of the application, which includes a first style of publisher therein.

The application needs to display the navigation bar on the screen of the electronic device for a long time, which is convenient for the application to recommend various functions in the application to the user, so that the user can use the application conveniently and increase the user's interest in using the application.

The navigation bar is used to provide a set of recommended functions of the application. The specific implementations of the application and navigation bar are not limited in the present disclosure. In some embodiments, the navigation bar is located at the bottom of the screen.

Controls in the navigation bar can include: publishers. The application also needs to display the publisher on the screen for a long time, so that the user can experience the function of creating multimedia content and/or starting live webcast, and the publisher can increase the user's enjoyment of using the application.

The publisher is used to create multimedia content and/or start the live webcast. This disclosure does not limit the specific implementation of the publisher. In some embodiments, the publisher is located in the middle of the navigation bar. It should be noted that in addition to the publisher, the controls in the navigation bar can also include one or more page options, and each page option is used to trigger displaying a recommended page in the application, so that users can watch rich and shared contents.

To sum up, a first type of publisher can be displayed in the navigation bar on the screen of the electronic device. The first style can be understood as a representation style of the icon of the publisher. The specific implementation of the first style is not limited in the present disclosure.

S102. switch to display of a second style of publisher in the navigation bar from the first style of publisher, when no operation triggered on the publisher is received after a first preset duration, wherein the color contrast between the second style of publisher and the navigation bar is smaller than that between the first style of publisher and the navigation bar; and/or the display area of target color in the second style of publisher is smaller than that in the first style of publisher, and the target color is a color which is most distinct from the fill color of the navigation bar.

Based on the description of step S101, the first style of publisher is displayed in the screen of the electronic device. Therefore, during usage of the application, the user is likely to trigger the publisher to create multimedia contents and/or start live webcast.

After the first preset duration, the electronic device does not receive the operation on the publisher triggered by the user, therefore, the electronic device can determine that the user does not create multimedia content and does not want to start live webcast. Among others, the specific value of the first preset duration can be determined based on parameters, such as actual conditions, empirical values and so on.

Under the above circumstances, by changing the style of publisher, the electronic device can switch to display the second style of publisher in the navigation bar from the first style of publisher, so that the number and power consumption of pixel points in the screen area where the publisher is located can be reduced, and the problem of screen burning or afterimage appearing in the screen area where the publisher is located due to long-time display can be avoided.

Among others, the color contrast between the second style of publisher and the navigation bar is smaller than that between the first style of publisher and the navigation bar, and the specific explanation can include:

From the color point of view, the color contrast between the second style of publisher and the navigation bar is smaller than that between the first style of publisher and the navigation bar. That is, compared with the first style of publisher, the second style of publisher is closer to the navigation bar in terms of fill color.

For example, assuming that the fill color (or referred to as base color or background color) of the navigation bar is black, the fill color of the first style of publisher is white, and the fill color of the second style of publisher is gray.

Among others, the display area of the target color in the second style of publisher is smaller than that in the first style of publisher, and the target color is a color which is most distinct from the fill color of the navigation bar, and the specific explanation can include:

From the area point of view, the display area of the target color in the second style of publisher is smaller than that in the first style of publisher, and the target color is the color which is most distinct from the fill color of the navigation bar. That is, compared with the first style of publisher, the display area of the target color in the second style of publisher is smaller.

For example, assuming the fill color (or be referred to as base color or background color) of the navigation bar is black, the color which is most distinct from the fill color of the navigation bar is white, that is, the target color is white. Therefore, the display area of the white color in the first style publisher is larger than that in the second style publisher.

To sum up, the brightness difference between the publisher and the navigation bar is reduced.

It should be noted that in addition to the above two implementations, the present disclosure can implement different styles of publishers in combination with the above two implementations. In addition, the present disclosure can also shorten the display time of the first style of publisher, that is, reduce the value of the first preset duration, so that the brightness difference between the publisher and the navigation bar becomes smaller.

According to the page display method for an application provided by the invention, a navigation bar is displayed by an electronic device on a screen, and the navigation bar comprises a first style of publisher. After a first preset duration, if no operation triggered on the publisher is received, the electronic device switches to display a second style of publisher in the navigation bar from the first style of publisher. Among others, the color contrast between the second style of publisher and the navigation bar is smaller than that between the first style of publisher and the navigation bar; and/or, the display area of a target color in the second style of publisher is smaller than that in the first style of publisher, and the target color is a color which is most distinct from a fill color of the navigation bar. Therefore, by adjusting parameters, such as brightness, color and duration, etc., to change the style of publisher, the brightness difference between the publisher and the navigation bar is reduced, the number and power consumption of pixel points in the screen area where the publisher is located which are in white always-on states are reduced, and the problem of screen burning or afterimage appearing in the screen area where the publisher is located due to long-time display of the publisher is avoided, so that the electronic device can display the publisher in the navigation bar for a long time, which improves the user's experience of using applications and prolongs the service life of the screen of the electronic device.

Based on the description of the above embodiments, the electronic device reduces the brightness difference between the publisher and the navigation bar by changing the parameters involved in the style of the publisher, such as color and/or shape, etc.

Next, with reference to FIGS. 2A-2C, 3A-3B, 4A-4B, and 5A-5B, specific implementations of the first and second styles of publishers will be described in detail.

For convenience of explanation, in FIGS. 2A-2C, 3A-3B, 4A-4B and 5A-5B, there illustrates an example in which the electronic device is a mobile phone, the screen of the mobile phone is an OLED screen, and a short video social APP (abbreviated as application 1) is installed in the mobile phone.

In a feasible implementation, the first style of publisher can include a background element filled with the target color and a key element located inside the background element. The second style of publisher may include: a key element that is not filled with the target color.

Among others, the background element is used to highlight the publisher, and the key element is used to trigger the publisher. This disclosure does not limit specific implementations of the background element and the key element.

In some embodiments, the background element may be in a shape of rounded rectangular ring, and the key elements may be in a shape of cross.

Figure 2A:
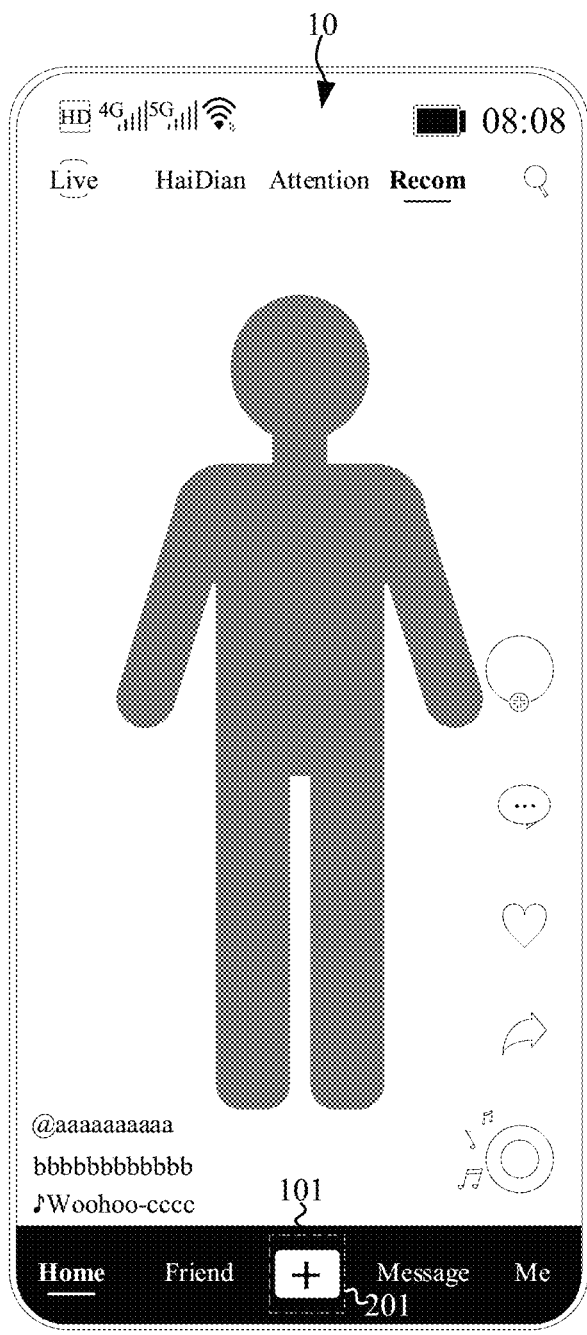
FIGS. 2A-2C are schematic diagrams of human-machine interaction interfaces provided by embodiments of the present disclosure.
Figure 2B:
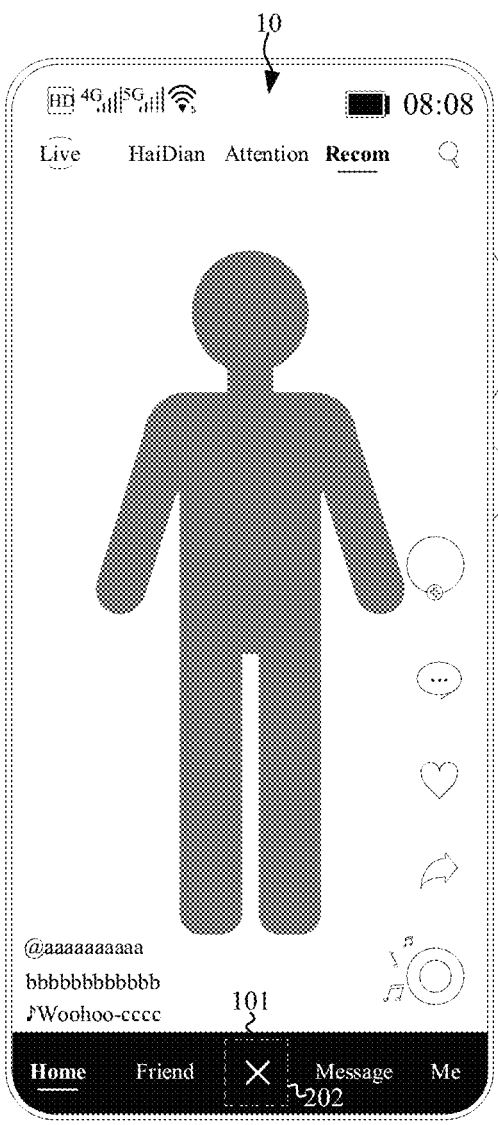
Figure 2C:
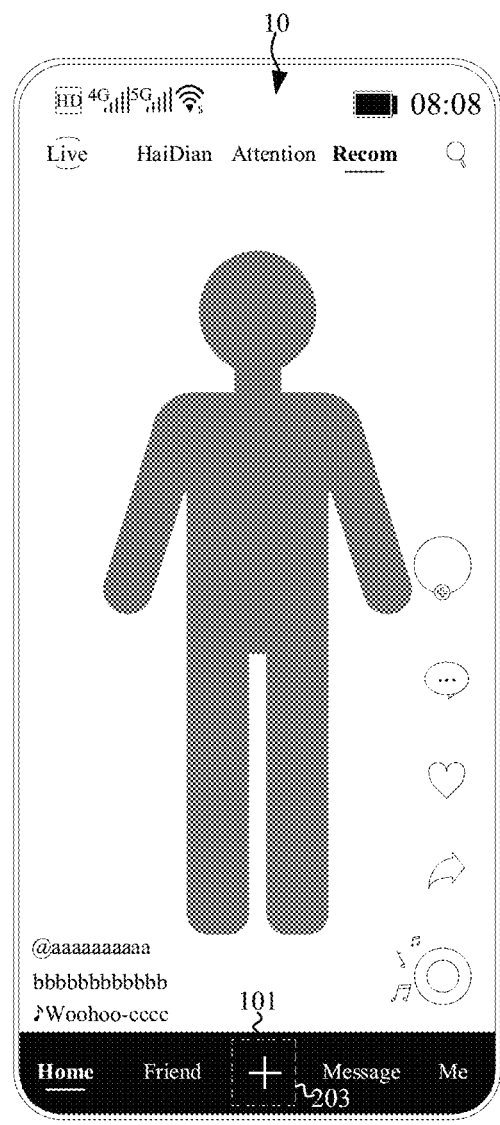

FIGS. 2A-2C are schematic diagrams of human-machine interaction interfaces provided by embodiments of the present disclosure.

The application 1 can display on a mobile phone a user interface 10 as exemplarily shown in FIG. 2A, the user interface 10 is used to display the playing page of application 1, and the application 1 can perform a certain set of functions in the playing page of the application 1, such as playing a video and displaying a navigation bar, or displaying multiple messages and navigation bars, or the like.

The user interface 10 may include a navigation bar 101, indicating that a user can trigger controls in the navigation bar 101 in the user interface 10, and the navigation bar 101 can be used to trigger controls in the navigation bar 101. For convenience of explanation, the present disclosure takes setting the fill color of the navigation bar 101 as black as an example.

In FIG. 2A, the navigation bar 101 may include a first style of publisher 201, which indicates that a user can trigger the publisher 201 in the navigation bar 101, and the publisher 201 is used to trigger creation of multimedia contents and/or starting of live webcast.

Since the fill color of the navigation bar 101 is black, the target color is white. Therefore, the fill color of the first style of publisher 201 can be set to white, that is, the first style of publisher 201 can be displayed as a background element filled with white color and in a shape of rounded rectangular ring and a key element filled with black color and in a shape of cross.

After a first period of time elapses, when the application 1 does not receive user's operation performed in the navigation bar 101 shown in FIG. 2A such as clicking the publisher 201, the application 1 can sequentially display the second style of publishers 202 on the user interface 10 as exemplarily shown in FIGS. 2B and 2C, wherein the second style of publisher 202 can be displayed as a key element filled with white color and in a shape of cross. Therefore, the key elements in the shape of cross can be rotated and displayed in the navigation bar 101, and the publisher can be highlighted, which is beneficial to arouse users' interest in triggering the publisher.

To sum up, when a user is unwilling to create multimedia contents and start live webcast, the electronic device can display a dynamic process of changing the style of the publisher, which not only reduces the power consumption caused by long-time display of the publisher, avoids the problem of screen burning or afterimage in the screen area where the publisher is located, but also arouses users' interest in triggering the publisher.

In other embodiments, the background element may be in a shape of rounded rectangular ring, and the key element may be in a shape of circle.

Figure 3A:
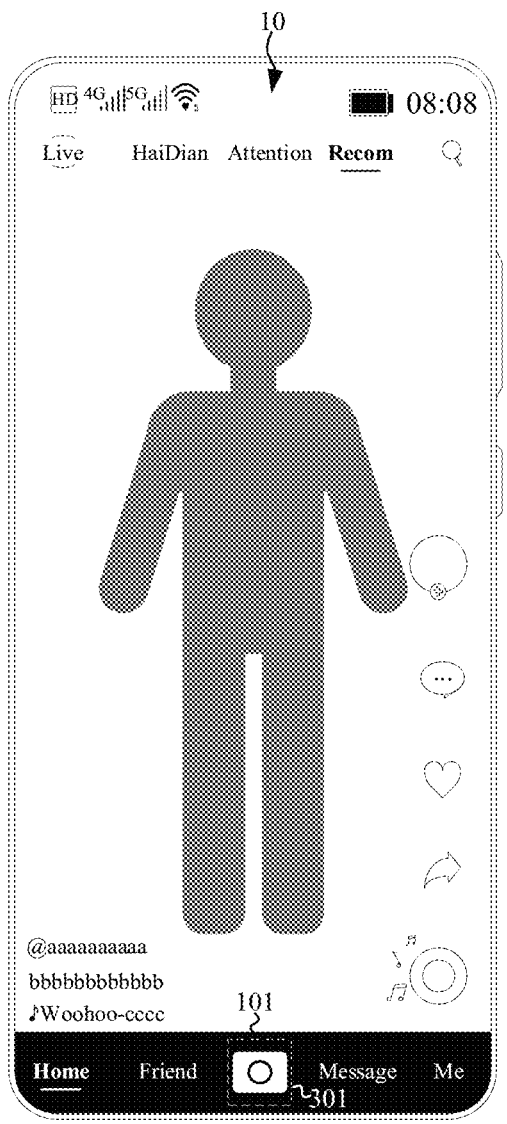
FIGS. 3A-3B are schematic diagrams of human-machine interaction interfaces provided by embodiments of the present disclosure.
Figure 3B:
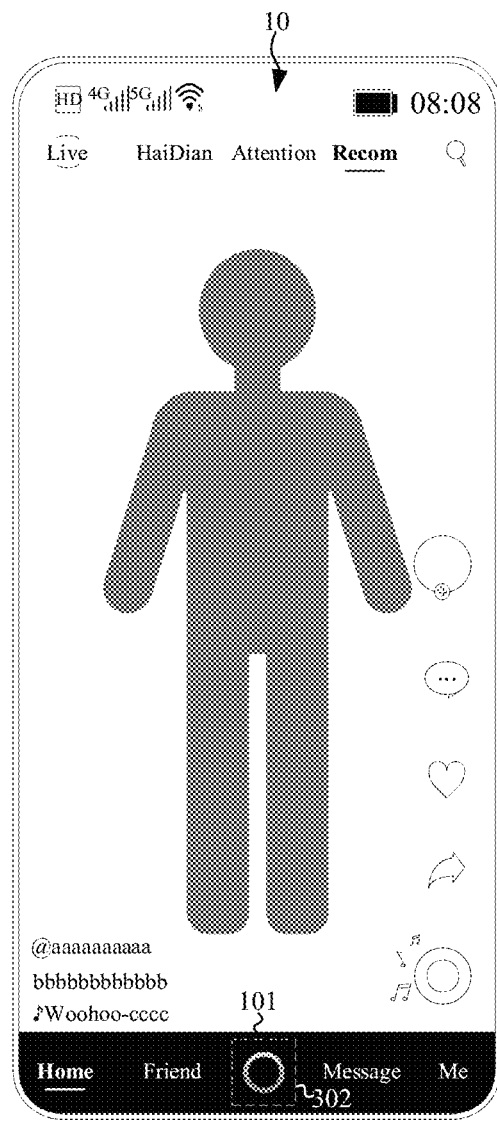

FIGS. 3A-3B are schematic diagrams of human-machine interaction interfaces provided by embodiments of the present disclosure.

The application 1 can display on the mobile phone a user interface 10 as exemplarily shown in FIG. 3A. The user interface 10 is used to display the playing page in the application 1, and the application 1 can perform a certain set of functions in the playing page of the application 1, such as playing a video and displaying a navigation bar, or displaying multiple messages and navigation bars, or the like.

The user interface 10 may include a navigation bar 101, indicating that a user can trigger controls in the navigation bar 101 in the user interface 10, and the navigation bar 101 can be used to trigger controls in the navigation bar 101. For convenience of explanation, the present disclosure takes setting the fill color of the navigation bar 101 as black as an example.

In FIG. 3A, the navigation bar 101 may include a first style of publisher 301, which indicates that a user can trigger the publisher 301 in the navigation bar 101, and the publisher 301 is used to trigger creation of multimedia contents and/or starting of live webcast.

Since the fill color of the navigation bar 101 is black, the target color is white. Therefore, the fill color of the first style of publisher 301 can be set to white, that is, the first style of publisher 301 can be displayed as a background element filled with white color and in a shape of rounded rectangular ring and a key element filled with black color and in a shape of cross.

After a first period of time elapses, when the application 1 does not receive the user's operation performed in the navigation bar 101 shown in FIG. 3A such as clicking the publisher 301, the application 1 can display the second style of publishers 302 on the user interface 10 as exemplarily shown in FIG. 3B, wherein the second style of publisher 302 can be displayed as a key element filled with gray color and in a shape of circle. Therefore, the key elements of the circular shape can be amplified and displayed in the navigation bar 101, and the publisher can be highlighted, which is beneficial to arouse users' interest in triggering the publisher.

To sum up, when a user is unwilling to create multimedia contents and start live webcast, the electronic device can dynamically display a process of changing the style of the publisher, which not only reduces the power consumption caused by long-time display of the publisher, avoids the problem of screen burning or afterimage in the screen area where the publisher is located, but also arouses users' interest in triggering the publisher.

In a feasible implementation, the first style of publisher can include a background element filled with the target color and a key element located inside the background element. The second style of publisher may include: a background element filled with a first color and a key element located inside the background element, and the first color is not the target color.

The background element is used to highlight the publisher, and the key element is used to trigger the publisher. This disclosure does not limit specific implementations of the background element and the key element.

In some embodiments, the background element may be in a shape of circle and the key element may be in a shape of cross.

Figure 4A:
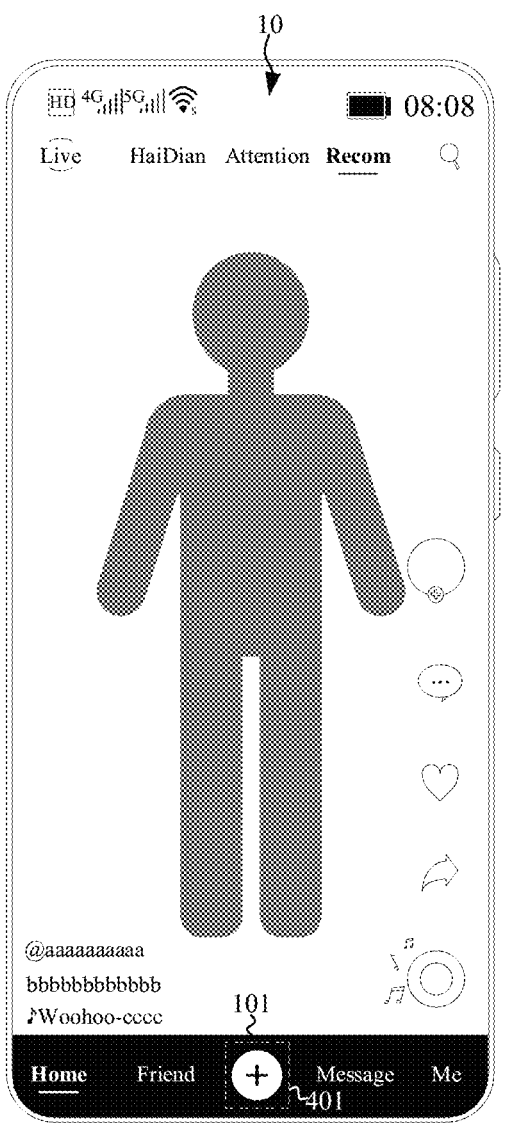
FIGS. 4A-4B are schematic diagrams of human-machine interaction interfaces provided by embodiments of the present disclosure.
Figure 4B:
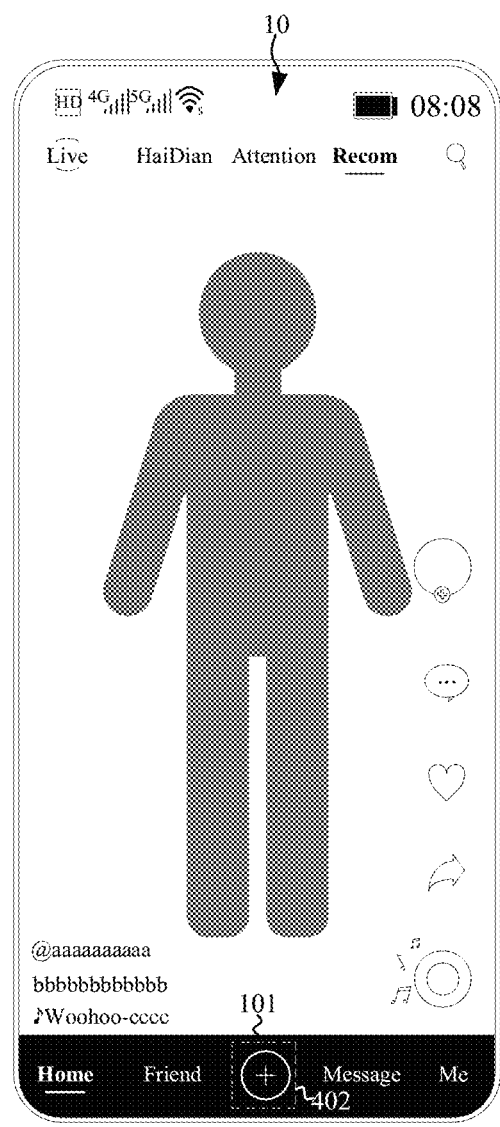

FIGS. 4A-4B are schematic diagrams of human-machine interaction interfaces provided by embodiments of the present disclosure.

The application 1 can display on the mobile phone a user interface 10 as exemplarily shown in FIG. 4A. The user interface 10 is used to display the playing page in the application 1, and the application 1 can perform a certain set of functions in the playing page of the application 1, such as playing a video and displaying a navigation bar, or displaying multiple messages and navigation bars, or the like.

The user interface 10 may include a navigation bar 101, indicating that a user can trigger controls in the navigation bar 101 in the user interface 10, and the navigation bar 101 can be used to trigger controls in the navigation bar 101. For convenience of explanation, the present disclosure takes setting the fill color of the navigation bar 101 as black as an example.

In FIG. 4A, the navigation bar 101 may include a first style of publisher 401, which indicates that a user can trigger the publisher 401 in the navigation bar 101, and the publisher 401 is used to trigger creation of multimedia contents and/or starting of live webcast.

Since the fill color of the navigation bar 101 is black, the target color is white. Furthermore, a first color is set to black. Therefore, the fill color of the first style of publisher 401 can be set to white, that is, the first style of publisher 401 can be displayed as a background element filled with white color and in a shape of circular ring and a key element filled with black color and in a shape of cross.

After a first period of time elapses, when the application 1 does not receive the user's operation performed in the navigation bar 401 shown in FIG. 4A such as clicking the publisher 401, the application 1 can display the second style of publishers 402 on the user interface 10 as exemplarily shown in FIG. 4B, wherein the second style of publisher 402 can be displayed as a background element filled with back color and in a shape of circular ring and a key element filled with white color and in a shape of cross.

To sum up, when a user is unwilling to create multimedia contents and start live webcast, the electronic device can change the style of the publisher, which reduces the power consumption caused by long-time display of the publisher, avoids the problem of screen burning or afterimage in the screen area where the publisher is located.

In other embodiments, the background element may be in a shape of rounded rectangular ring, and the key element may be in a shape of cross.

Figure 5A:
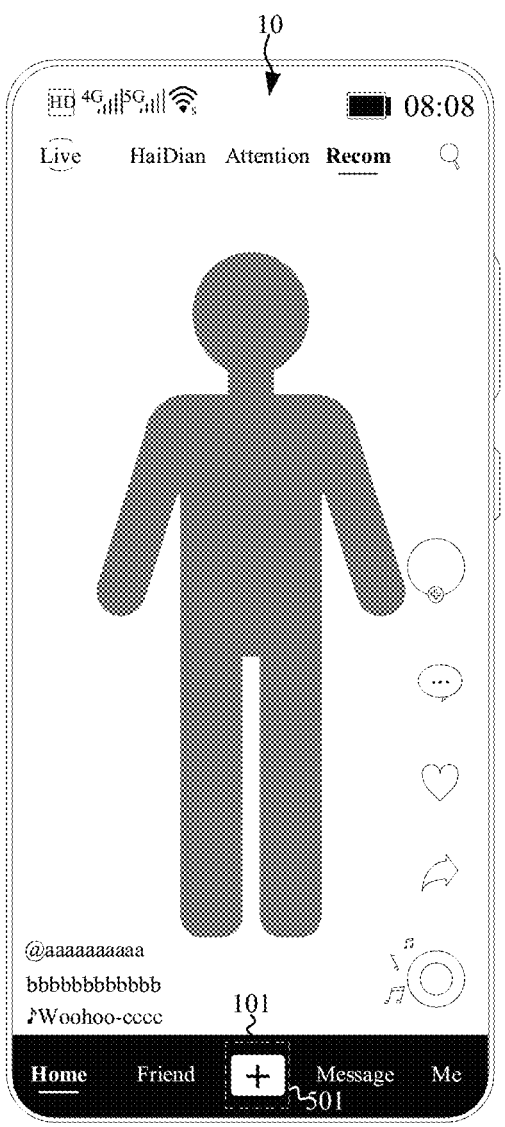
FIGS. 5A-5B are schematic diagrams of human-machine interaction interfaces provided by embodiments of the present disclosure.
Figure 5B:
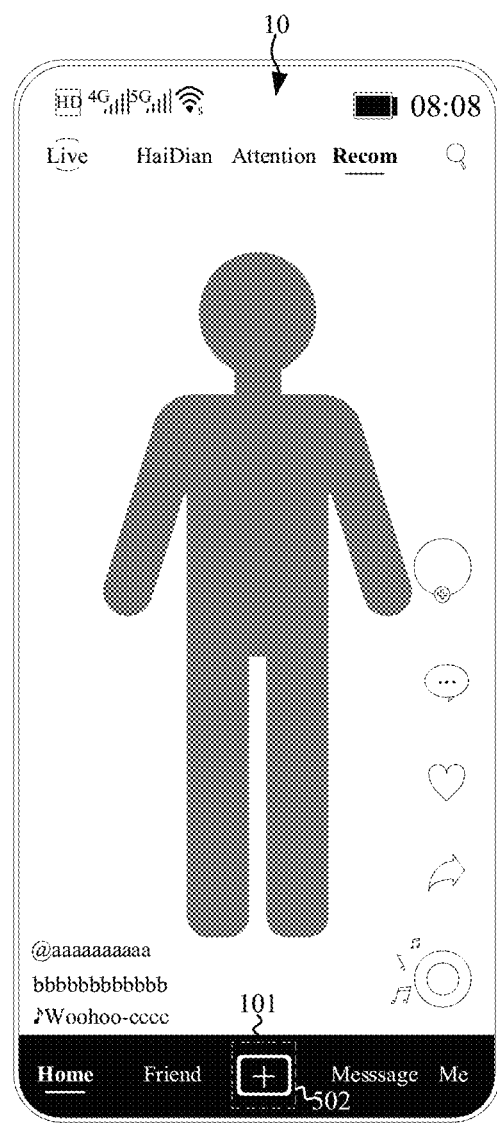

FIGS. 5A-5B are schematic diagrams of human-machine interaction interfaces provided by embodiments of the present disclosure.

The application 1 can display on the mobile phone a user interface 10 as exemplarily shown in FIG. 5A. The user interface 10 is used to display the playing page in the application 1, and the application 1 can perform a certain set of functions in the playing page of the application 1, such as playing a video and displaying a navigation bar, or displaying multiple messages and navigation bars, or the like.

The user interface 10 may include a navigation bar 101, indicating that a user can trigger controls in the navigation bar 101 in the user interface 10, and the navigation bar 101 can be used to trigger controls in the navigation bar 101. For convenience of explanation, the present disclosure takes setting the fill color of the navigation bar 101 as black as an example.

In FIG. 5A, the navigation bar 101 may include a first style of publisher 501, which indicates that a user can trigger the publisher 501 in the navigation bar 101, and the publisher 501 is used to trigger creation of multimedia contents and/or starting of live webcast.

Since the fill color of the navigation bar 101 is black, the target color is white. Furthermore, a first color is set to black. Therefore, the fill color of the first style of publisher 501 can be set to white, that is, the first style of publisher 501 can be displayed as a background element filled with white color and in a shape of circular ring and a key element filled with black color and in a shape of cross.

After a first period of time elapses, when the application 1 does not receive the user's operation performed in the navigation bar 501 shown in FIG. 5A such as clicking the publisher 501, the application 1 can display the second style of publishers 502 on the user interface 10 as exemplarily shown in FIG. 5B, wherein the second style of publisher 502 can be displayed as a background element filled with back color and in a shape of rounded rectangular ring and a key element filled with white color and in a shape of cross.

To sum up, when a user is unwilling to create multimedia contents and start live webcast, the electronic device can change the style of the publisher, which reduces the power consumption caused by long-time display of the publisher, avoids the problem of screen burning or afterimage in the screen area where the publisher is located.

In other embodiments, the electronic device may adjust the style of the publisher based on the contents displayed in the application.

When an electronic device plays a multimedia content of an application, in addition to background elements and key elements, the second style of publisher may also include a first identification element located inside the background elements.

The first identification element is used to indicate that the publisher can be triggered to create multimedia contents. This disclosure does not limit the specific implementation of the first identification element. In some embodiments, the first identification element may take the form of word, picture, character, etc.

To sum up, by changing the style of the publisher, the electronic device can inform the user that the multimedia content of the application is being played, which is also beneficial to arouse the user's interest in triggering the publisher.

When playing a live webcast picture of an application, in addition to background elements and key elements, the second style of publisher may also include a second identification element located inside the background elements.

The second identification element is used to indicate that the publisher can be triggered to start live webcast. This disclosure does not limit the specific implementation of the second identification element. In some embodiments, the second identification element may take the form of word, picture, character, etc.

Therefore, by changing the style of the publisher, the electronic device can inform the user that the live webcast picture of the application is being played, which is also beneficial to arouse the user's interest in triggering the publisher.

Figure 6A:
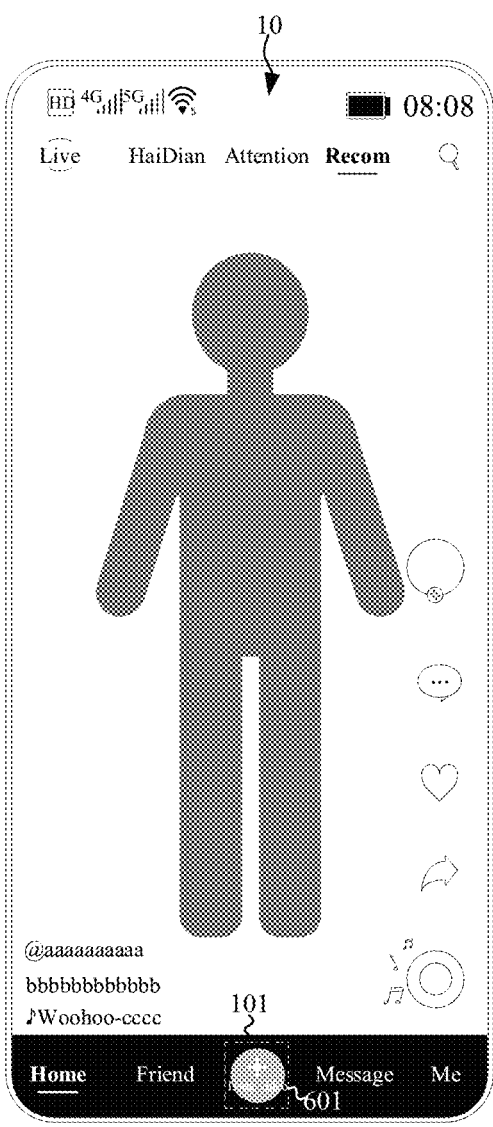
FIGS. 6A-6B are schematic diagrams of human-machine interaction interfaces provided by embodiments of the present disclosure.
Figure 6B:
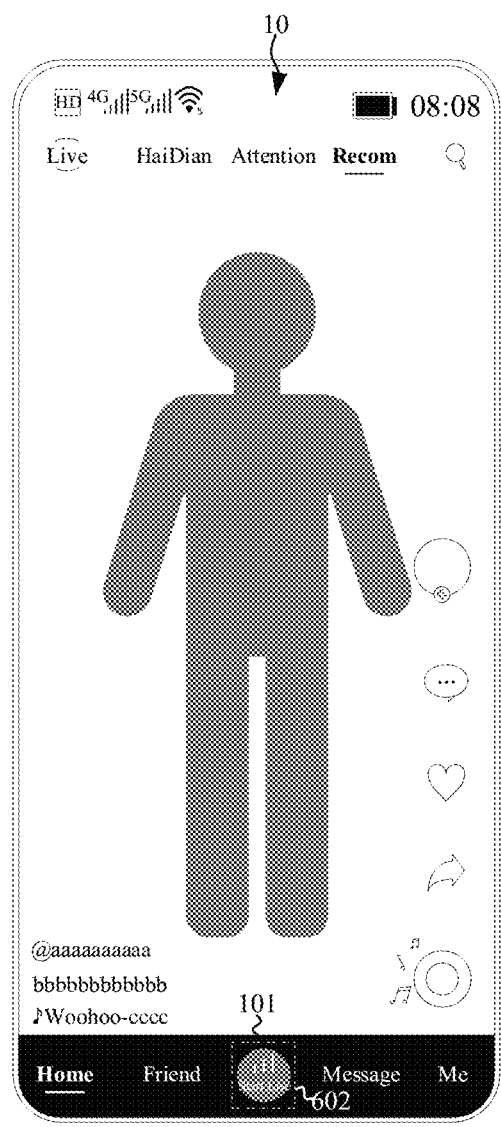

FIGS. 6A-6B are schematic diagrams of human-machine interaction interfaces provided by embodiments of the present disclosure.

The application 1 can display on the mobile phone the user interface 10 as exemplarily shown in FIG. 6A or 6B, and the user interface 10 is used to display the playing page of the application 1, and the application 1 can perform a certain set of functions in the playing page of the application 1, such as playing a video and displaying a navigation bar.

The user interface 10 may include a navigation bar 101 for indicating that the user can trigger the controls in the navigation bar 101 in the user interface 10, and the navigation bar 101 can be used to trigger controls in the navigation bar 101. For convenience of explanation, this disclosure takes the fill color of the navigation bar 101 as black as an example.

As shown in FIG. 6A, when a multimedia content of the application 1 is played in the user interface 10, the navigation bar 101 may include a second style of publisher 601, which indicates that a user can trigger the publisher 601 in the navigation bar 101, and the publisher 601 is used to trigger creation of multimedia contents.

Since the fill color of the navigation bar 101 is black, the target color is white. Furthermore, a first color is set to light grey. Therefore, the fill color of the second style of publisher 601 can be set to light grey, that is, the second style of publisher 601 can be displayed as a background element filled with light grey color and in a shape of circular ring, a key element filled with white color and in a shape of cross, and a first identification element in the form of white font "issue video".

As shown in FIG. 6B, when a live webcast picture of the application 1 is played in the user interface 10, the navigation bar 101 may include a second style of publisher 602, which indicates that a user can trigger the publisher 602 in the navigation bar 102, and the publisher 602 is used to trigger starting of live webcast.

Since the fill color of the navigation bar 101 is black, the target color is white. Furthermore, a first color is set to dark grey. Therefore, the fill color of the second style of publisher 602 can be set to dark grey, that is, the second style of publisher 602 can be displayed as a background element filled with dark grey color and in a shape of circular ring, a key element filled with white color and in a signal shape, and a second identification element in the form of white font "start live".

It should be noted that, beside the circular ring shape, the background element can also be in a shape of rounded rectangular ring, which is not limited by this disclosure.

Based on the description of the above embodiments, the publisher is displayed in the screen of the electronic device. After a second preset duration elapses, the electronic device does not receive an operation triggered by the user on the publisher, that is, the electronic device can determine that the user is unwilling to create multimedia contents and start live webcast. Among others, the second preset duration is greater than the first preset duration, and the specific value of the second preset duration can be determined based on parameters, such as actual conditions, empirical values, and so on.

Under the above circumstances, the electronic device can hide the navigation bar in the screen, which reduces the power consumption caused by the navigation bar, avoids the problem of screen burning or afterimage in the screen area where the navigation bar is located.

Figure 7:
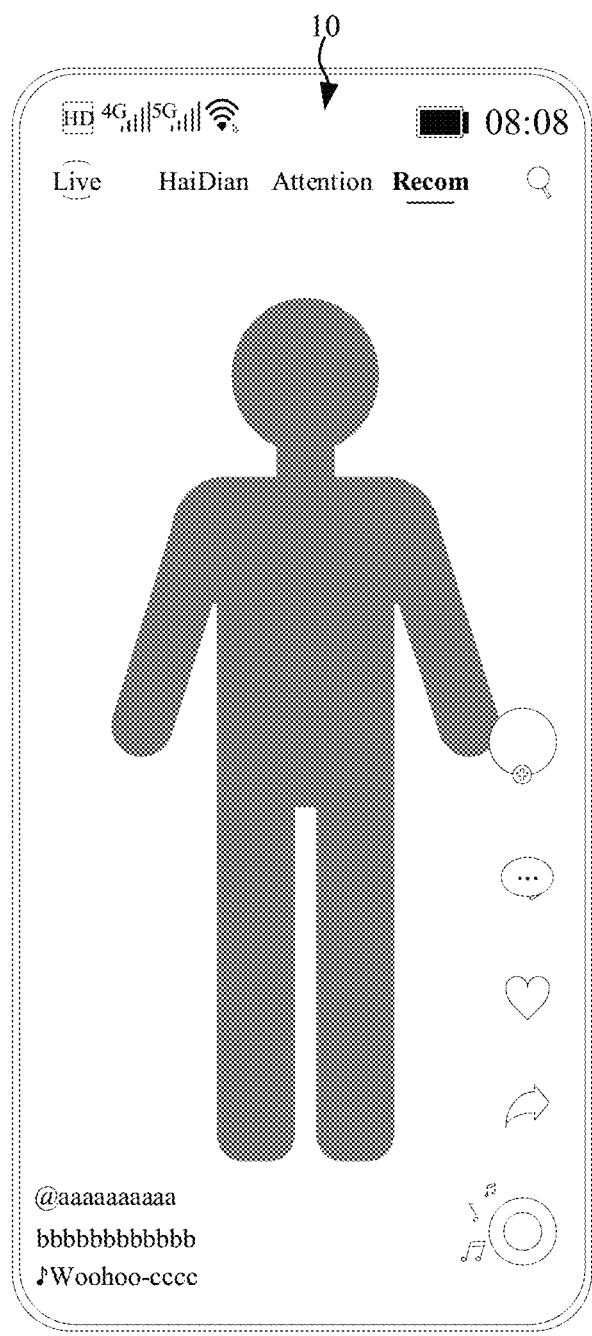
FIG. 7 is a schematic diagram of a human-machine interaction interface provided by an embodiment of the present disclosure.

FIG. 7 is a schematic diagram of a human-machine interaction interface provided by an embodiment of the present disclosure.

The application 1 can display a user interface 10 exemplarily shown in FIGS. 2A-2C, 3A-3B, 4A-4B, 5A-5B and 6A-6B on the mobile phone. The user interface 10 is used to display the playing page in the application 1, and the application 1 can perform a certain set of functions in the playing page of the application 1, such as playing a video and displaying a navigation bar, or displaying multiple messages and navigation bars, or the like.

The user interface 10 may include a navigation bar 101, indicating that a user can trigger controls in the navigation bar 101 in the user interface 10, and the navigation bar 101 can be used to trigger controls in the navigation bar 101. For convenience of explanation, the present disclosure takes setting the fill color of the navigation bar 101 as black as an example.

After a second duration elapses, when the application 1 does not receive the user's operation in the navigation bar 101 as shown in any of FIGS. 2A-2C, 3A-3B, 4A-4B, 5A-5B and 6A-6B, such as clicking the publisher, the application 1 can display the user interface 10 exemplarily shown in FIG. 7 on the mobile phone, wherein the user interface 10 does not include the navigation bar 101 therein. Therefore, the electronic device can hide the navigation bar.

Exemplarily, the present disclosure provides a page display apparatus for an application.

Figure 8:
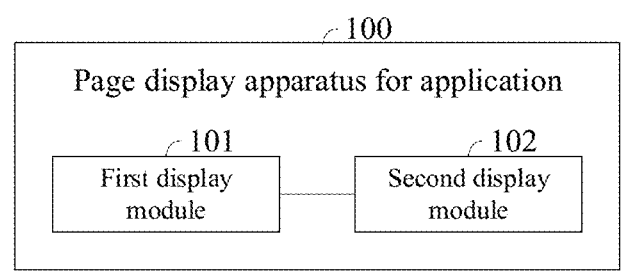
FIG. 8 is a structural schematic diagram of a page display apparatus for an application provided by an embodiment of the present disclosure.

FIG. 8 is a structural diagram of a page display apparatus for an application provided by an embodiment of the present disclosure. The page display apparatus for the application according to the present disclosure can be configured in an electronic device, and can implement operations of the electronic device corresponding to the page display method for the application according to the embodiments of FIGS. 1-7 described above.

As shown in FIG. 8, the page display apparatus 100 for the application provided by the present disclosure may include a first display module 101 and a second display module 102.

A first display module 101, configured to display a navigation bar of the application, which includes a first style of publisher therein, the navigation bar is configured to provide a set of recommended functions of the application, and the publisher is configured to create multimedia content and/or start live webcast;

A second display module 102, configured to when no operation triggered on the publisher is received after a first preset duration, switch to display a second style of publisher in the navigation bar from the first style of publisher, wherein the color contrast between the second style of publisher and the navigation bar is smaller than that between the first style of publisher and the navigation bar; and/or the display area of target color in the second style of publisher is smaller than that in the first style of publisher, and the target color is a color which is most distinct from the fill color of the navigation bar.

In some embodiments, the first style of publisher includes a background element filled with the target color and a key element located inside the background element; the second style of publisher includes a key element that is not filled with the target color, wherein the background element is used to highlight the publisher, and the key element is used to trigger the publisher.

In some embodiments, the background element is in a shape of rounded rectangular ring and the key element is in a shape of cross.

In some embodiments, the second display module 102 is specifically used to rotate and display the key element in a navigation bar.

In some embodiments, the background element is in a shape of rounded rectangular ring and the key element is in a shape of circle.

In some embodiments, the second display module 102 is specifically used to enlarge the key element in the navigation bar.

In some embodiments, the first style of publisher includes: a background element filled with a target color and a key element located inside the background element; the second style of publisher includes: a background element filled with the first color and a key element located inside the background element, the first color is not the target color; wherein the background element is used to highlight the publisher, and the key element is used to trigger the publisher.

In some embodiments, the background element is in a shape of circular ring and the key element is in a shape of cross, or, the background element is in a shape of rounded rectangular ring, and the key element is in a shape of cross.

In some embodiments, when playing a multimedia content of an application, the second style of publisher further includes a first identification element located inside the background element, which is used to indicate that the publisher can be triggered to create the multimedia content;

Or, when playing a live webcast picture of the application, the second style of publisher further includes a second identification element located in the background element, which is used to indicate that the publisher can be triggered to start the live webcast.

Figure 9:
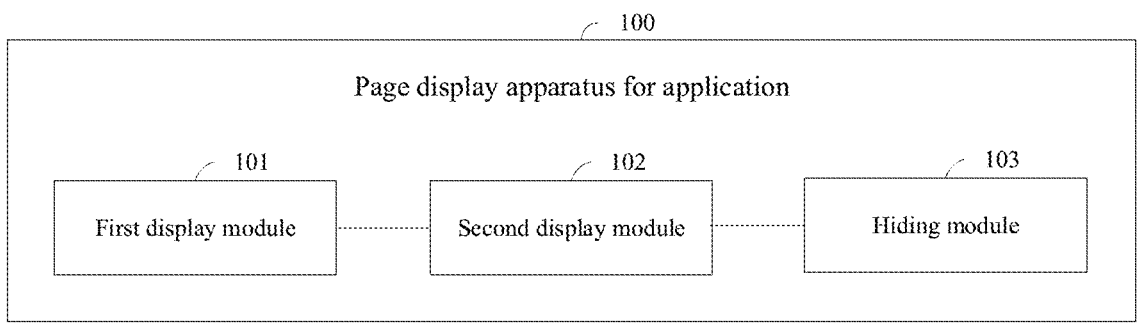
FIG. 9 is a structural schematic diagram of a page display apparatus for an application provided by an embodiment of the present disclosure.

FIG. 9 is a structural diagram of a page display apparatus for an application provided by an embodiment of the present disclosure. As shown in FIG. 9, the page display apparatus 100 for the application provided by the present disclosure may further include a hiding module 103, based on the apparatus structure as shown in FIG. 8.

The hiding module 103 is configured to hide the navigation bar when no operation triggered on the publisher is received after a second preset duration, wherein the second preset duration is greater than the first preset duration.

The page display apparatus for the application provided by this disclosure can execute the above method embodiment, and its specific implementation principle and technical effect can refer to the above method embodiment, and will not be repeated herein.

Exemplarily, the present disclosure provides an electronic device including one or more processors; memory; and one or more computer programs; wherein one or more computer programs are stored in the memory; and when the one or more processors execute the one or more computer programs, the electronic device can realize the page display method for the application according to the previous embodiment.

Exemplarily, the present disclosure provides a chip system, which is applied to an electronic device including a display, a memory and a sensor; the chip system includes a processor; when the processor executes computer instructions stored in the memory, the electronic device executes the page display method for the application according to the previous embodiment.

Exemplarily, the present disclosure provides a computer-readable storage medium on which a computer program is stored, and the computer program, when executed by a processor, cause an electronic device to execute the page display method for the application according to the previous embodiment.

Exemplarily, the present disclosure provides a computer program product that, when the computer program product runs on a computer, causes the computer to execute the page display method for the application according to the previous embodiment.

In the above embodiments, all or part of the functions can be realized by software, hardware, or a combination of software and hardware. When implemented in software, the functions can be implemented in whole or in part in the form of a computer program product. A computer program product includes one or more computer instructions. When computer program instructions are loaded and executed on a computer, the flow or function according to embodiments of the present disclosure is generated in whole or in part. The computer can be a general-purpose computer, a special purpose computer, a computer network, or other programmable devices. Computer instructions may be stored in a computer-readable storage medium. Computer-readable storage medium can be any available medium that can be accessed by computers, or a data storage device that integrates one or more available medium, such as server and data center. The available medium can be magnetic medium (e.g., floppy disk, hard disk, magnetic tape), optical medium (e.g., DVD), or semiconductor medium (e.g., solid state disk (SSD)), etc.

It should be noted that in this paper, relational terms such as "first" and "second" are only used to distinguish one entity or operation from another entity or operation, and do not necessarily require or imply any such actual relationship or order exists between these entities or operations. Furthermore, the terms "include", "comprise" or any other variation thereof are intended to cover non-exclusive inclusion, so that a process, method, article or equipment including a series of elements includes not only those elements, but also other elements not explicitly listed, or further includes elements inherent to such process, method, article or equipment. Without further limitation, the element defined by the sentence "including one . . . " does not exclude that there are other identical elements in the process, method, article or equipment including the element.

The above is only specific embodiments of this disclosure, so that those skilled in the art can understand or realize this disclosure. Various modifications to these embodiments will be apparent to those skilled in the art, and the general principles defined herein may be implemented in other embodiments without departing from the spirit or scope of this disclosure. Therefore, this disclosure will not be limited to the embodiments described herein, but should be accorded to the widest scope consistent with the principles and novel features disclosed herein.

What is claimed is:

1. A page display method for an application, comprising:
    displaying a navigation bar of the application, wherein the navigation bar comprises a first style of publisher, the navigation bar is used for providing a set of recommended functions of the application, and the publisher is used for creating multimedia contents and/or starting live webcast;
    when no operation triggered on the publisher is received after a first preset duration, switching to display a second style of publisher in the navigation bar from the first style of publisher, and a color contrast between the second style of publisher and the navigation bar is smaller than that between the first style of publisher and the navigation bar, and/or a display area of a target color in the second style of publisher is smaller than that of the target color in the first style of publisher, and the target color is a color which is most distinct from a fill color of the navigation bar.

2. The method of claim 1, wherein,
    the first style of publisher includes a background element filled with a target color and a key element located inside the background element; and
    the second style of publisher includes a key element that is not filled with the target color;
    wherein, the target color is a color which is most distinct from a fill color of the navigation bar.

3. The method of claim 2, wherein, the displaying the second style of publisher in the navigation bar comprises:
    rotating and displaying the key element in the navigation bar; or
    enlarging and displaying the key element in the navigation bar.

4. The method of claim 1, wherein,
    the first style of publisher includes a background element filled with a target color and a key element located inside the background element; and
    the second style of publisher includes a key element filled with a first color and a key element located inside the background element, the first color is not the target color;
    wherein, the target color is a color which is most distinct from a fill color of the navigation bar.

5. The method of claim 4, wherein,
    when playing a multimedia content of the application, the second style of publisher further includes a first identification element located inside the background element, which is used to indicate that the publisher is able to be triggered to create multimedia contents; or
    when playing a live webcast picture of the application, the second style of publisher further includes a second identification element located in the background element, which is used to indicate that the publisher is able to be triggered to start the live webcast.

6. The method of claim 1, wherein, the method further comprises:
    hiding the navigation bar when no operation triggered on the publisher is received after a second preset duration, wherein the second preset duration is greater than the first preset duration.

7. An electronic device comprising:
    one or more processors; and
    a memory, wherein one or more computer programs are stored in the memory;
    wherein, the one or more computer programs, when executed by the one or more processors, cause the electronic device to
    display a navigation bar of the application, wherein the navigation bar comprises a first style of publisher, the navigation bar is used for providing a set of recommended functions of the application, and the publisher is used for creating multimedia contents and/or starting live webcast;
    when no operation triggered on the publisher is received after a first preset duration, switch to display a second style of publisher in the navigation bar from the first style of publisher, and a color contrast between the second style of publisher and the navigation bar is smaller than that between the first style of publisher and the navigation bar, and/or a display area of a target color in the second style of publisher is smaller than that of the target color in the first style of publisher, and the target color is a color which is most distinct from a fill color of the navigation bar.

8. The electronic device of claim 7, wherein,
the first style of publisher includes a background element filled with a target color and a key element located inside the background element; and
the second style of publisher includes a key element that is not filled with the target color;
wherein, the target color is a color which is most distinct from a fill color of the navigation bar.

9. The electronic device of claim 8, wherein, the one or more computer programs, when executed by the one or more processors, cause the electronic device to display the second style of publisher in the navigation bar by:
rotating and displaying the key element in the navigation bar; or
enlarging and displaying the key element in the navigation bar.

10. The electronic device of claim 7, wherein,
the first style of publisher includes a background element filled with a target color and a key element located inside the background element; and
the second style of publisher includes a key element filled with a first color and a key element located inside the background element, the first color is not the target color;
wherein, the target color is a color which is most distinct from a fill color of the navigation bar.

11. The electronic device of claim 10, wherein,
when playing a multimedia content of the application, the second style of publisher further includes a first identification element located inside the background element, which is used to indicate that the publisher is able to be triggered to create multimedia contents; or
when playing a live webcast picture of the application, the second style of publisher further includes a second identification element located in the background element, which is used to indicate that the publisher is able to be triggered to start the live webcast.

12. The electronic device of claim 7, wherein, the one or more computer programs, when executed by the one or more processors, cause the electronic device to:
hide the navigation bar when no operation triggered on the publisher is received after a second preset duration, wherein the second preset duration is greater than the first preset duration.

13. A non-transitory computer storage medium, characterized in comprising computer instructions which, when running on an electronic device, cause the electronic device to
display a navigation bar of the application, wherein the navigation bar comprises a first style of publisher, the navigation bar is used for providing a set of recommended functions of the application, and the publisher is used for creating multimedia contents and/or starting live webcast;
when no operation triggered on the publisher is received after a first preset duration, switch to display a second style of publisher in the navigation bar from the first style of publisher, and a color contrast between the second style of publisher and the navigation bar is smaller than that between the first style of publisher and the navigation bar, and/or a display area of a target color in the second style of publisher is smaller than that of the target color in the first style of publisher, and the target color is a color which is most distinct from a fill color of the navigation bar.

14. The non-transitory computer storage medium of claim 13, wherein,
the first style of publisher includes a background element filled with a target color and a key element located inside the background element; and
the second style of publisher includes a key element that is not filled with the target color;
wherein, the target color is a color which is most distinct from a fill color of the navigation bar.

15. The non-transitory computer storage medium of claim 14, wherein, the computer instructions which, when running on the electronic device, cause the electronic device to display the second style of publisher in the navigation bar by:
rotating and displaying the key element in the navigation bar; or
enlarging and displaying the key element in the navigation bar.

16. The non-transitory computer storage medium of claim 13, wherein,
the first style of publisher includes a background element filled with a target color and a key element located inside the background element; and
the second style of publisher includes a key element filled with a first color and a key element located inside the background element, the first color is not the target color;
wherein, the target color is a color which is most distinct from a fill color of the navigation bar.

17. The non-transitory computer storage medium of claim 16, wherein,
when playing a multimedia content of the application, the second style of publisher further includes a first identification element located inside the background element, which is used to indicate that the publisher is able to be triggered to create multimedia contents; or
when playing a live webcast picture of the application, the second style of publisher further includes a second identification element located in the background element, which is used to indicate that the publisher is able to be triggered to start the live webcast.

18. The non-transitory computer storage medium of claim 13, wherein, the computer instructions which, when running on the electronic device, cause the electronic device to:
hide the navigation bar when no operation triggered on the publisher is received after a second preset duration, wherein the second preset duration is greater than the first preset duration.

* * * * *